US011177865B2

(12) United States Patent
Sundararajan et al.

(10) Patent No.: US 11,177,865 B2
(45) Date of Patent: Nov. 16, 2021

(54) PRECODER RESOURCE GROUP ALLOCATION METHODS FOR MIMO COMMUNICATION

(71) Applicants: QUALCOMM Incorporated, San Diego, CA (US); Jay Kumar Sundararajan, San Diego, CA (US); Alexandros Manolakos, San Diego, CA (US); Yu Zhang, Beijing (CN)

(72) Inventors: Jay Kumar Sundararajan, San Diego, CA (US); Alexandros Manolakos, San Diego, CA (US); Yu Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/610,890

(22) PCT Filed: May 8, 2018

(86) PCT No.: PCT/CN2018/085978
§ 371 (c)(1),
(2) Date: Nov. 4, 2019

(87) PCT Pub. No.: WO2018/205921
PCT Pub. Date: Nov. 15, 2018

(65) Prior Publication Data
US 2021/0083735 A1 Mar. 18, 2021

(30) Foreign Application Priority Data

May 12, 2017 (WO) ................ PCT/CN2017/084161

(51) Int. Cl.
*H04B 7/0456* (2017.01)
*H04B 7/06* (2006.01)
*H04L 5/00* (2006.01)

(52) U.S. Cl.
CPC ......... *H04B 7/0473* (2013.01); *H04B 7/0478* (2013.01); *H04B 7/066* (2013.01); *H04L 5/0026* (2013.01)

(58) Field of Classification Search
CPC .... H04B 7/0473; H04B 7/0478; H04B 7/066; H04L 5/0026
(Continued)

(56) References Cited

U.S. PATENT DOCUMENTS

2013/0336135 A1    12/2013   Lindoff et al.
2014/0036804 A1*    2/2014   Chen ................ H04W 72/0406
                                                        370/329
(Continued)

FOREIGN PATENT DOCUMENTS

CN    103312396 A    9/2013
CN    104396202 A    3/2015
(Continued)

OTHER PUBLICATIONS

International Search Report and Written Opinion—PCT/CN2018/085978—ISA/EPO—dated Jun. 28, 2018.
(Continued)

*Primary Examiner* — Fitwi Y Hailegiorgis
(74) *Attorney, Agent, or Firm* — Loza & Loza, LLP/Qualcomm

(57) ABSTRACT

Aspects of the present disclosure disclose various methods for grouping network resources into precoder resource groups (PRGs) for precoding in MIMO communication. A user equipment (UE) may select a common precoder that may not be restricted to a codebook for precoding the resources in the same PRG. These resource grouping methods provide the UE with the flexibility to select a precoder that is well suited to the channel or bandwidth. Moreover, the base station may reduce downlink signaling because it
(Continued)

does not need to signal the precoder choice to the UE. In some examples, the base station may receive PRG based channel state information feedback that facilitates DL precoding. Other aspects, embodiments, and features are also claimed and described.

30 Claims, 15 Drawing Sheets

(58) Field of Classification Search
USPC .......................................... 375/262; 370/329
See application file for complete search history.

(56) References Cited

U.S. PATENT DOCUMENTS

| | | | | |
|---|---|---|---|---|
| 2014/0126506 | A1* | 5/2014 | Horiuchi | ............... H04L 5/0048 370/329 |
| 2014/0307703 | A1 | 10/2014 | Gaal et al. | |

FOREIGN PATENT DOCUMENTS

| | | |
|---|---|---|
| CN | 106357314 A | 1/2017 |
| WO | WO-2014208940 A1 | 12/2014 |
| WO | 2017003689 A1 | 1/2017 |
| WO | 2017008731 A1 | 1/2017 |

OTHER PUBLICATIONS

International Search Report and Written Opinion—PCT/CN2017/084161—ISA/EPO—dated Jan. 31, 2018.
Huawei, et al, "Non-Codebook Based Transmission for UL MIMO", 3GPP Draft; 3GPP TSG RAN WG1 Meeting #89, R1-1706923, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15, 2017-May 19, 2017, May 6, 2017 (May 6, 2017), XP051261580, pp. 1-6, Retrieved from the Internet: URL: http://www.3gpp.org/ftp/tsg_ran/WG1_RL1/TSGR1_89/Docs/, [retrieved on May 6, 2017].
Qualcomm Incorporated: "Non-Codebook Based UL Transmission", 3GPP Draft; 3GPP TSG RAN WG1 #88, R1-1702600, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017 (Feb. 12, 2017), XP051209754, pp. 1-4, Retrieved from the Internet: URL: https://www.3gpp.org/ftp/Meetings_3GPP_SYNC/RAN1/Docs/, [retrieved on Feb. 12, 2017].
Samsung: "PRB Bundling and Precoding Granularity in UL DMRS", 3GPP Draft; 3GPP TSG RAN1 88, R1-1702914, 3rd Generation Partnership Project (3GPP), Mobile Competence Centre; 650, Route Des Lucioles; F-06921 Sophia-Antipolis Cedex, France, vol. RAN WG1, No. Athens; Feb. 13, 2017-Feb. 18, 2017, Feb. 2017 (Feb. 6, 2017), XP051220697, Retrieved from the Internet: URL: http://www.3gpp.org/ftp/tsg_ran/WG1_RL1/TSGR1_88/Docs/, [retrieved on Feb. 6, 2017], Chapter 3.2; p. 2.
Samsung: "Precoding Granularity of NR DMRS", 3GPP Draft; 3GPP TSG RAN WG1 Ad-hoc Meeting, R1-1700930, 3rd Generation Partnership Project (3GPP), Mobile Competence Centre; 650, Route Des Lucioles; F-06921, Sophia-Antipolis Cedex, France, vol. RAN WG1, No. Spokane, USA, Jan. 16, 2017-Jan. 20, 2017, Jan. 16, 2017 (Jan. 16, 2017), XP051208446, 6 Pages, Retrieved from the Internet: URL: http://www.3gpp.org/ftp/Meetings_3GPP_SYNC/RAN1/Docs/, [retrieved on Jan. 16, 2017], p. 2; tables 1,2.
Supplementary European Search Report—EP18799371—Search Authority—The Hague—dated Nov. 17, 2020.
Huawei, et al., "Codebook based Transmission for UL MIMO", 3GPP TSG RAN WG1 Meeting #88bis, R1-1705071, Spokane, USA, Apr. 3-7, 2017, 8 Pages, 20170324.

\* cited by examiner

PRECODER RESOURCE GROUP ALLOCATION METHODS FOR MIMO COMMUNICATION

PRIORITY CLAIM

This application claims priority to and the benefit of PCT international application no. PCT/CN2017/084161 filed in the Chinese Patent Office on May 12, 2017, the entire content of which is incorporated herein by reference as if fully set forth below in its entirety and for all applicable purposes.

TECHNICAL FIELD

The technology discussed below relates generally to wireless communication systems, and more particularly, to precoder selection methods in wireless communication.

INTRODUCTION

In many existing wireless communication systems, a single device is capable of transmitting one or more data streams from multiple different antennas at the same time. Typically, precoding is applied to the data streams to distribute them among the antennas. That is, the data streams are multiplied with different weighting and phase shifting before being transmitted from their respective antennas. Precoding is a process that distributes incoming data (e.g., layered data) to different antenna ports. This can provide single-stream beamforming, where the same data stream is transmitted over each of the antennas. Here, the linear combined signal transmitted from the multiple antennas results in a directional radiation beam. This is typically referred to as beamforming.

In another example, known as multiple-input multiple-output (MIMO), a plurality of data streams may be precoded and transmitted from different antennas. By virtue of the spatial diversity provided by the separately located antennas, the total capacity of the channel may be multiplied by the number of layers or streams Research continues to advance MIMO technologies. For example, multi-user MIMO (MU-MIMO) provides multiple access to a MIMO channel for multiple spatially distributed users with multiple antennas. MU-MIMO can provide significantly improved performance over conventional single user MIMO.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure provide various methods for grouping network resources into groups or blocks for precoding in communications using multiple-input multiple-output (MIMO). In some examples, a user equipment (UE) may select a common precoder that is not restricted to a codebook for precoding communication using resources in the same group or block. These precoder resource grouping methods provide the UE with the flexibility to select a precoder that is well suited to the channel. Moreover, the base station can reduce downlink signaling because there is no need for the base station to signal the selected precoder(s) to the UE. In some embodiments, the base station may receive channel state information feedback that facilitates downlink (DL) MIMO precoding.

The base station can take into account various considerations when configuring a UE to select a certain method for grouping communication resources for precoding purpose. Some non-limiting examples of the considerations are UE restrictions on the number of precoders supported, channel estimation accuracy resulted from the grouping method selected, frequency selectivity of the channel, interference estimation granularity, etc.

One aspect of the disclosure provides a method of MIMO communication operable at a UE. The UE receives a precoder resource grouping configuration from a scheduling entity. The UE groups a plurality of time-frequency resources of a MIMO channel into a plurality of precoder resource groups (PRGs) based on the precoder resource grouping configuration. The UE selects a common precoder for precoding data of the MIMO channel using the time-frequency resources that are located in a same one of the plurality of PRGs. The same common precoder is used for all time-frequency resources within the same PRG.

Another aspect of the disclosure provides an apparatus configured for MIMO communication. In some examples, the apparatus may be a scheduled entity or UE. The apparatus includes a communication interface configured for MIMO communication, a memory, and a processor operatively coupled to the communication and memory. The processor and the memory are configured to receive, from a scheduling entity, a precoder resource grouping configuration. In some examples, the scheduling entity may be a base station, eNB, or gNB. The processor and the memory are further configured to group a plurality of time-frequency resources of a MIMO channel into a plurality of PRGs using a method indicated by the precoder resource grouping configuration. The processor and the memory are further configured to select a common precoder for precoding data of the MIMO channel using the time-frequency resources that are located in a same one of the plurality of PRGs. The same common precoder is used for all time-frequency resources within the same PRG.

Another aspect of the disclosure provides a method of MIMO communication operable at a scheduling entity or UE. The scheduling entity determines a precoder resource grouping configuration that indicates a method for grouping a plurality of time-frequency resources of a MIMO channel into a plurality of PRGs. The scheduling entity transmits the precoder resource grouping configuration to a UE. The scheduling entity receives a MIMO transmission from the UE utilizing one or more of the plurality of PRGs. Data of the MIMO transmission is precoded using a common precoder for the plurality of time-frequency resources located in a same one of the plurality of PRGs.

Another aspect of the disclosure provides an apparatus configured for MIMO communication. The apparatus may be a scheduling entity (e.g., base station, eNB, gNB). The apparatus includes a communication interface configured for MIMO communication, a memory, and a processor operatively coupled to the communication interface and the memory. The processor and the memory are configured to determine a precoder resource grouping configuration that indicates a method for grouping a plurality of time-frequency resources of a MIMO channel into a plurality of PRGs. The processor and the memory are further configured to transmit the precoder resource grouping configuration to a UE. The processor and the memory are further configured to receive a MIMO transmission from the UE utilizing one or more of the plurality of PRGs. Data of the MIMO transmission is precoded using a common precoder for the plurality of time-frequency resources located in a same one of the plurality of PRGs.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
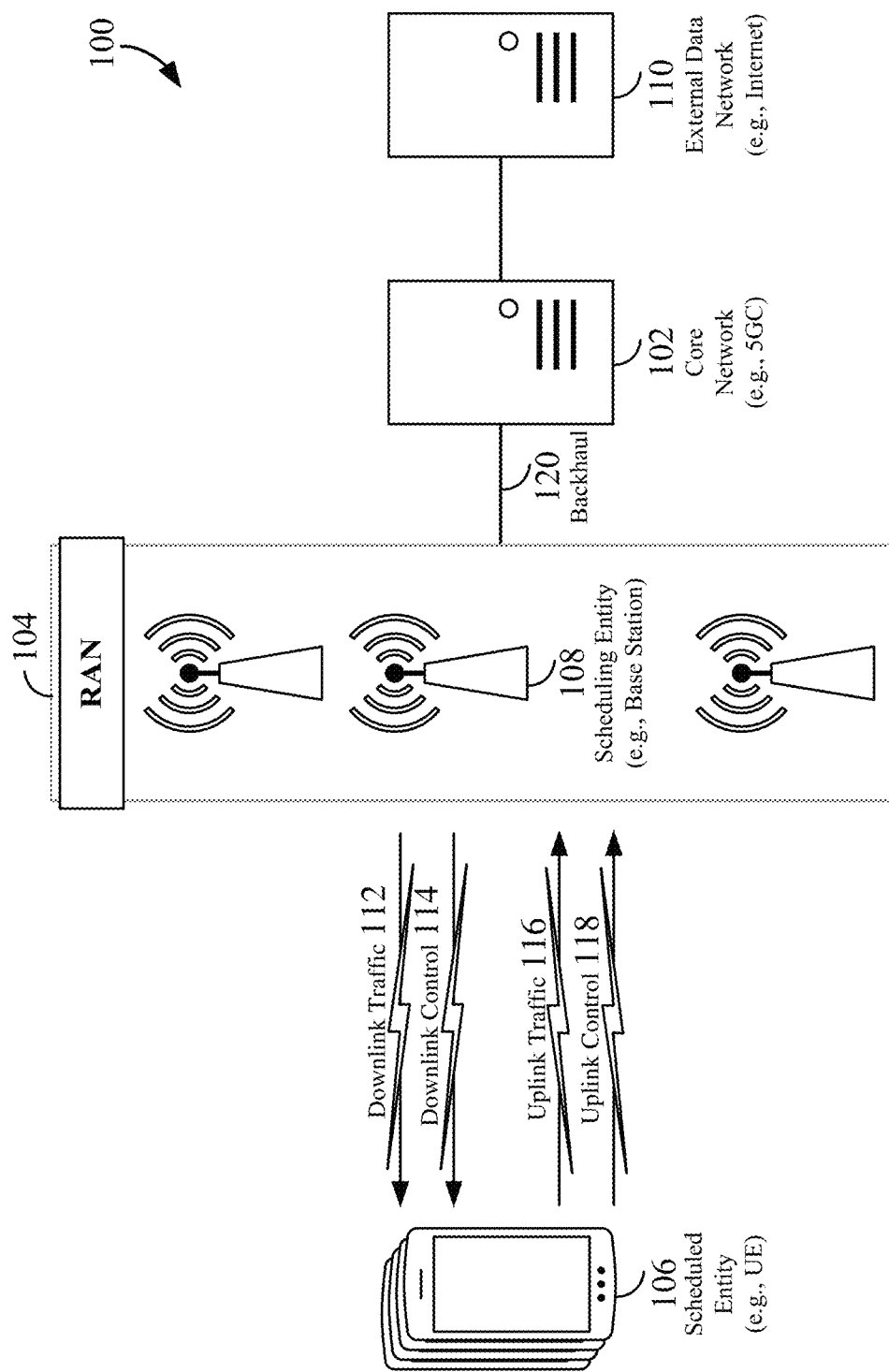
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The performance of a multiple-input multiple-output (MIMO) communication system is related to the received signal-to-interference-and-noise ratio (SINR) and the correlation properties of the multipath channel and antenna configuration. Using precoding techniques, the system can increase and/or equalize the received SINR across the multiple receive antennas. The transmitter can utilize a plurality of complex weighting matrices (precoders or a precoding matrix) to precode the streams of a MIMO channel. The precoding matrices can be defined in a codebook where each matrix can be identified by a precoding matrix index (PMI). When the codebook is known to both a transmitter and a receiver, the receiver (e.g., base station) can inform the transmitter (e.g., UE) to use a certain precoder (i.e., precoding matrix) by sending the PMI of the desired precoder to the transmitter.

In some aspects of the disclosure, the base station may provide the UE with the PMI from a predefined codebook. The UE may then select the precoder from the codebook based on the PMI for an uplink (UL) MIMO transmission. In some aspects of the disclosure, the UE may select a precoder that is not necessarily restricted to a codebook.

Such non-codebook based options provide the UE with the flexibility to select a precoder that is well suited to the channel. The base station may determine the precoder used by the UE based on the pilot (e.g., DMRS) transmitted by the UE. Moreover, the base station can reduce downlink signaling because there is no need for the base station to signal the PMI or precoder to the UE.

When a non-codebook based precoder is used in UL MIMO communication, an independent consideration is the frequency granularity over which the UE can select a common precoder. In some examples, the UE may use a same precoder in a certain bandwidth. A transmitter (e.g., UE) may have a capability restriction that limits the number of precoders that the UE can use for its allocated resources (e.g., time and frequency resources). In one example, the UE may be limited by its capability (e.g., number of transmit chains) to use only one precoder on all its allocated resource blocks (RBs). In another example, the UE may have a capability that can support the use of different precoders on different sets or groups of allocated RBs.

In some aspects of the disclosure, a UE may support the use of different non-codebook based precoders in different allocated sub-bands. In this case, the base station and the UE agree on the pattern or method(s) that the UE can use to select non-codebook based precoders across the allocated resources. The method selected by the UE needs to take into account several considerations. One consideration is that the UE may not be able to support more than a certain number of precoders. Another consideration is that the channel estimation accuracy can improve if the same precoder is used over a larger sub-band or bandwidth. Another consideration is that the channel may be frequency selective with a certain coherence bandwidth. Therefore, the UE may use a same precoder for the resources in the coherence bandwidth. Still another consideration is that interference estimation granularity may be impacted by the granularity of sub-band precoding (i.e., using different precoders for different sub-bands). In some examples, the sub-band precoding granularity is configured by the base station and provided to the transmitter (e.g., UE) in the form of a precoder resource group (PRG) bundling size. In some examples, the base station may signal the PRG bundling size to the UE using semi-static signaling such as RRC or system information block (SIB) messages. In some examples, the base station may signal the PRG bundling size to the UE using dynamic signaling such as a PDCCH of the UE or group-common PDCCH.

Definitions

Beamforming: directional signal transmission or reception. For a beamformed transmission, the amplitude and phase of each antenna in an array of antennas may be precoded, or controlled to create a desired (e.g., directional) pattern of constructive and destructive interference in the wavefront.

MIMO: multiple-input multiple-output. MIMO is a multi-antenna technology that exploits multipath signal propagation so that the information-carrying capacity of a wireless link can be multiplied by using multiple antennas at the transmitter and receiver to send multiple simultaneous streams. At the multi-antenna transmitter, a suitable precoding algorithm (scaling the respective streams' amplitude and phase) is applied (in some examples, based on known channel state information). At the multi-antenna receiver, the different spatial signatures of the respective streams (and, in some examples, known channel state information) can enable the separation of these streams from one another.

1. In single-user MIMO, the transmitter sends one or more streams to the same receiver, taking advantage of capacity gains associated with using multiple Tx, Rx antennas in rich scattering environments where channel variations can be tracked.
2. The receiver may track these channel variations and provide corresponding feedback to the transmitter. This feedback may include channel quality information (CQI), the number of preferred data streams (e.g., rate control, a rank indicator (RI)), and a precoding matrix index (PMI).

Massive MIMO: a MIMO system with a very large number of antennas (e.g., greater than an 8×8 array).

MU-MIMO: a multi-antenna technology where base station, in communication with a large number of UEs, can exploit multipath signal propagation to increase overall network capacity by increasing throughput and spectral efficiency, and reducing the required transmission energy.

1. The transmitter may attempt to increase the capacity by transmitting to multiple users using its multiple transmit antennas at the same time, and also using the same allocated time-frequency resources. The receiver may transmit feedback including a quantized version of the channel so that the transmitter can schedule the receivers with good channel separation. The transmitted data is precoded to maximize throughput for users and minimize inter-user interference.

OFDM: orthogonal frequency division multiplexing. An air interface may be defined according to a two-dimensional grid of resource elements, defined by separation of resources in frequency by defining a set of closely spaced frequency tones or subcarriers, and separation in time by defining a sequence of symbols having a given duration. By setting the spacing between the tones based on the symbol rate, inter-symbol interference can be eliminated. OFDM channels provide for high data rates by allocating a data stream in a parallel manner across multiple subcarriers.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
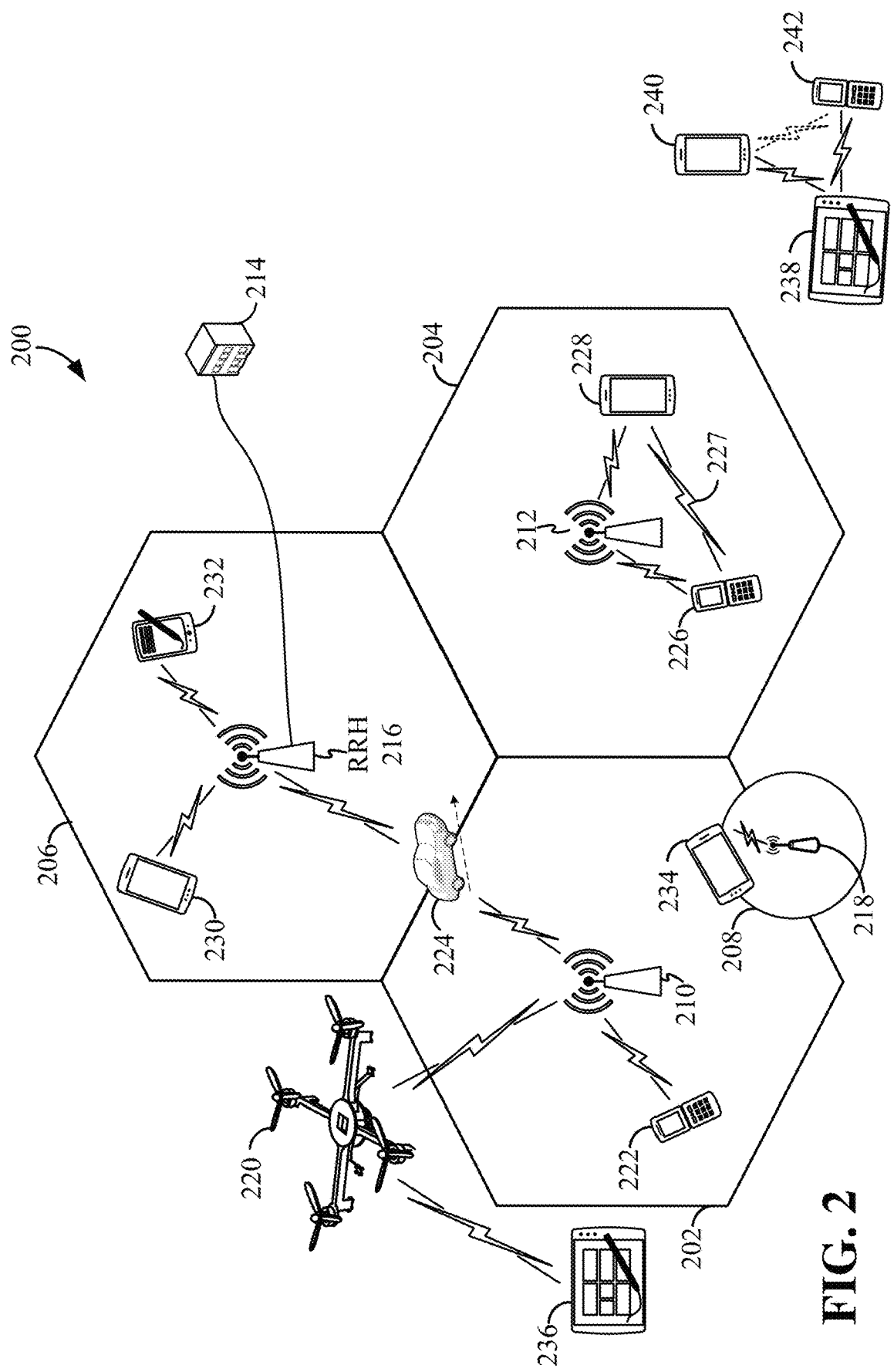
FIG. 2 is a conceptual illustration of an example of a radio access network.

FIG. 2 is a conceptual illustration of an example of a radio access network. By way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. In some example, a UE may communicate with one or more cells using MIMO communication. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
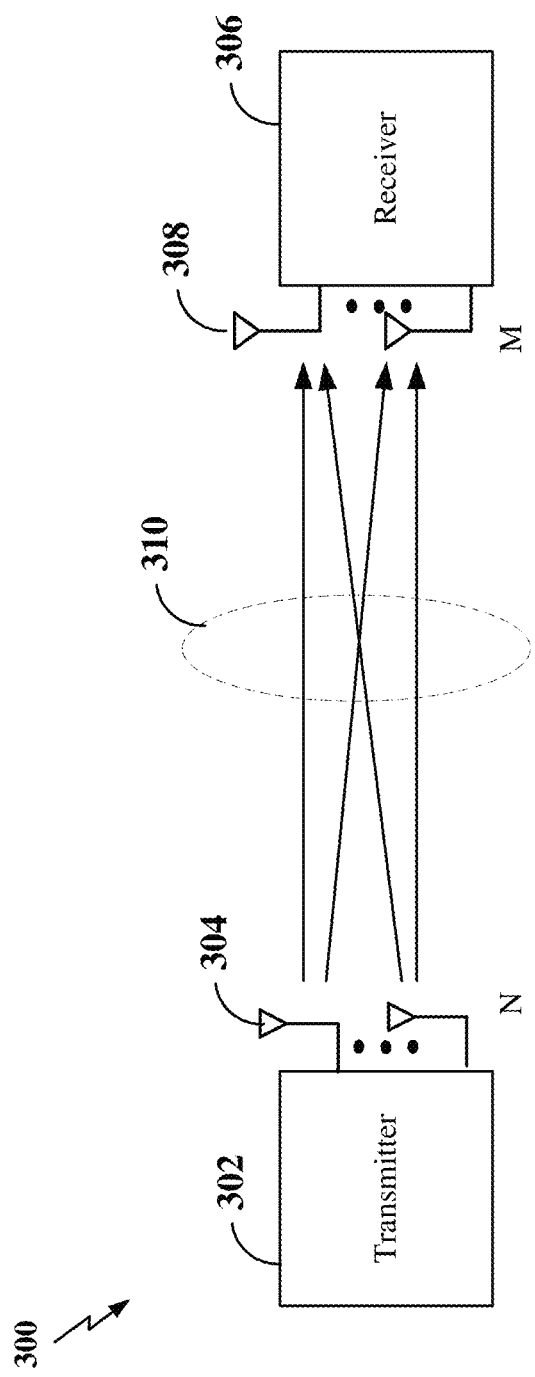
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream. In some aspects of disclosure, the UE may use codebook-based precoders or non-codebook based precoders.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the Channel State Information-Reference Signals (CSI-RS) with separate common reference signal (C-RS) sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Referring back to FIG. 2, in order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a predetermined duration (e.g., 10 ms) for wireless transmissions, with each frame consisting of a predetermined number of subframes (e.g., 10 subframes of 1 ms each). On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple numbers of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example. In some aspects of the disclosure, the RBs 408 may be arranged in groups to facilitate various precoder selection methods described below.

Each subframe (e.g., 1 ms subframe 402) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
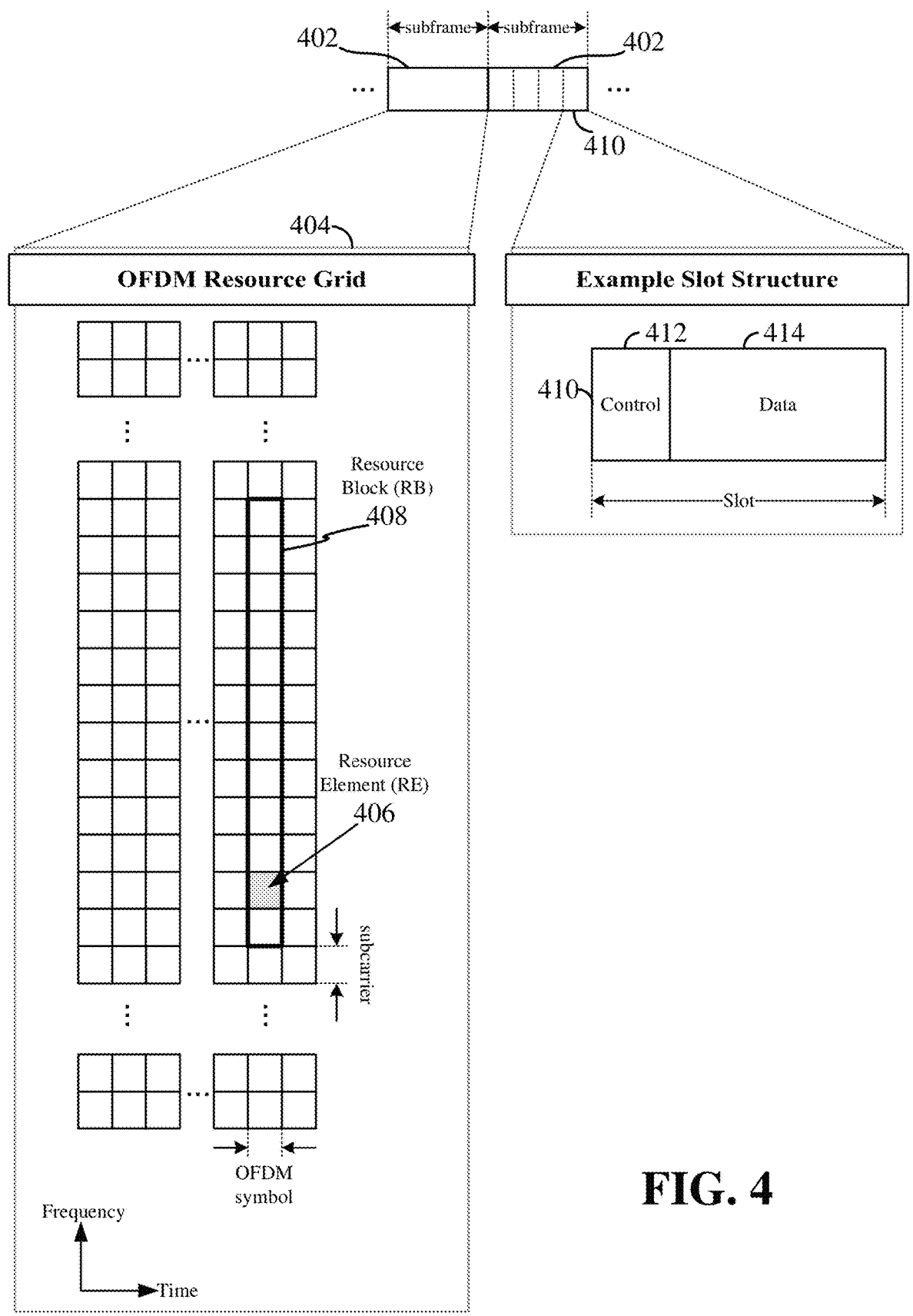
FIG. 4 is a schematic illustration of an organization of wireless resources in an air interface utilizing orthogonal frequency divisional multiplexing (OFDM).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 406 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry system information blocks (SIBs), carrying information that may enable access to a given cell.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

One or more aspects of the present disclosure relate to communication resource grouping methods for facilitating precoder selection in MIMO communication. The precoder selection methods described below take into account various considerations, such as frequency selectivity of the channel, UE restrictions or limitations, base station restrictions or limitations, operating SINR, sensitivity to channel estimation accuracy, accuracy of initial channel estimation, etc. The method selected may depend on which of these considerations may be more important than the others. These methods will be described in more detail below in turn with some illustrative examples.

In some UL MIMO examples, if codebook based precoding is used, the base station (e.g., scheduling entity 108) may specify the PMI for each sub-band in the UL grant, and so the precoder resource grouping is thus indicated implicitly. Therefore, there is no need to signal the precoder grouping method separately. If non-codebook based precoding is used by the UE, the methods described below may be used to group communication resources to facilitate precoder selection.

For DL MIMO, when the UE computes CQI and PMI feedback to be sent back to the base station, then the methods described in this disclosure may be used to determine the resource grouping for the purpose of computing the CQI and PMI. The base station may configure the UE with a precoder resource grouping method for the purpose of CQI and PMI measurement and reporting. RBs may be grouped into different precoder resource groups (PRGs), and a same precoder may be used for the RBs in the same PRG. A UE may be allocated with a number of resource blocks (RBs) for UL and DL MIMO. The RBs may be similar to the RB 408 of FIG. 4.

Figure 5:
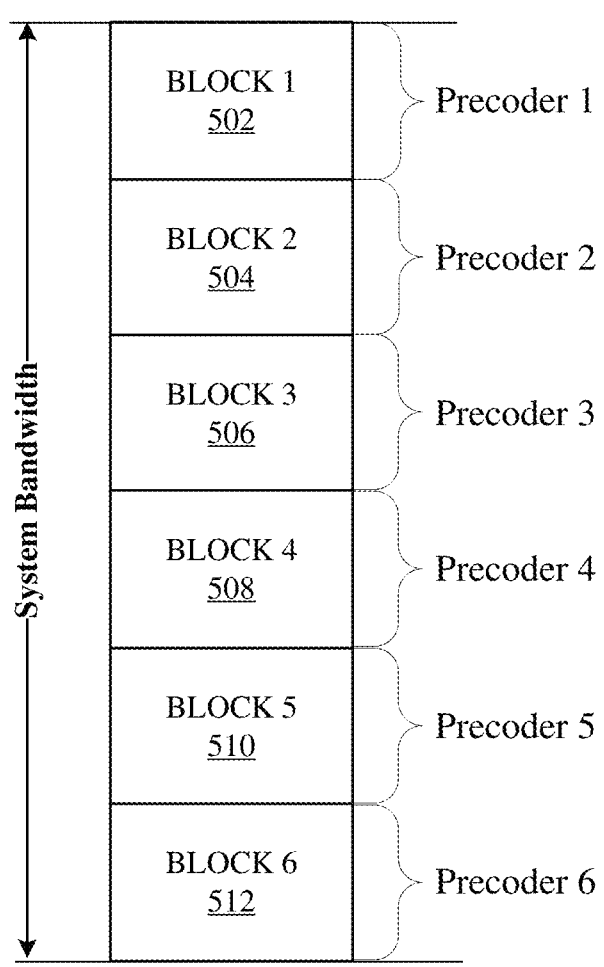
FIG. 5 is a diagram illustrating a first precoder resource grouping method for a MIMO channel according to some aspects of the disclosure.

FIG. 5 is a diagram illustrating a first precoder resource grouping method 500 for a MIMO channel according to some aspects of the disclosure. The system communication bandwidth may be divided into fixed blocks of a suitable size (i.e., number of RBs) equal to a precoder resource group (PRG) bundling size. A PRG includes a set or bundle of RBs (e.g., RB 408 of FIG. 4), where the RBs in the bundle are contiguous in the frequency domain. The PRG bundling size refers to the number of RBs included in one PRG. In the non-limiting example shown in FIG. 5, the system bandwidth may be divided into multiple blocks (e.g., six blocks 502, 504, 506, 508, 510, 512 shown in FIG. 5) each having a size equal to the PRG bundling size, which may be predetermined or configured by the scheduling entity. In this method, the UE can select a common precoder for the RBs within the same block corresponding to one PRG while taking into account various considerations. For example, the UE can use precoder 1 for precoding communication in block 1, precoder 2 for precoding communication in block 2, precoder 3 for precoding communication in block 3, precoder 4 for precoding communication in block 4, precoder 5 for precoding communication in block 5, and precoder 6 for precoding communication in block 6.

In one example, the scheduling entity may have allocated some resources in block 2, block 3, and block 4 to the UE. Therefore, the UE may use precoder 2 for the RBs in block 2, precoder 3 for the RBs in block 3, and precoder 4 for the RBs in block 4. In other examples, the UE may be allocated with resources in different blocks. This method can incorporate or exploit the channel coherence across the RBs in the same block by ensuring that the same precoder is used within a contiguous block of RBs. Therefore, if sub-bands or channels exhibit channel coherence (e.g., channels experience comparable or correlated amplitude fading) within a PRG, the scheduling entity may select this resource grouping method. In some examples, if the system bandwidth cannot be evenly divided into blocks of size equal to the PRG bundling size, one or more of the blocks may have a size less than the PRG bundling size, or other methods may be used to select the precoder, for example, as described in relation to FIGS. 6-10.

Figure 6:
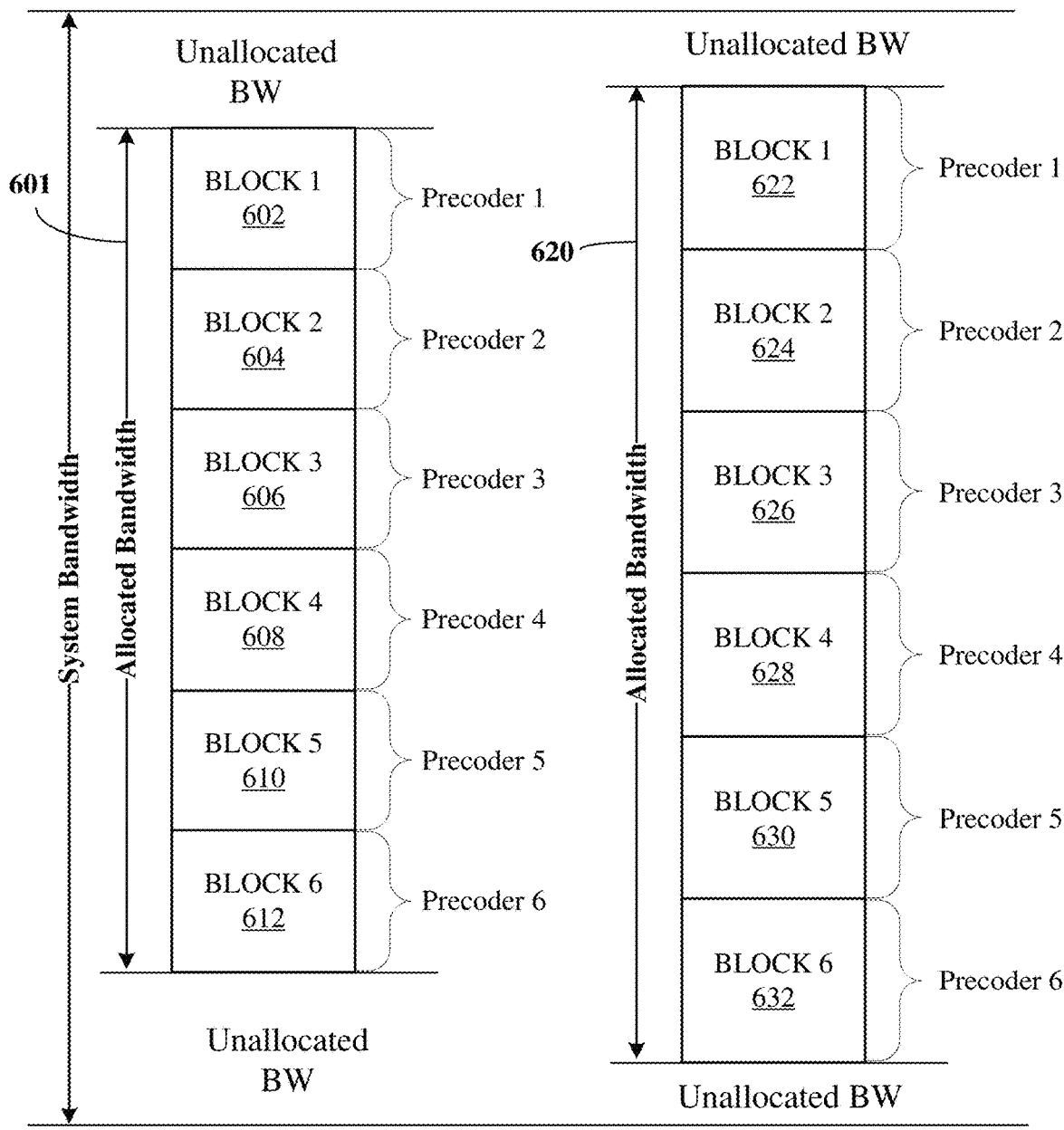
FIG. 6 is a diagram illustrating a second precoder resource grouping method for a MIMO channel according to some aspects of the disclosure.

FIG. 6 is a diagram illustrating a second precoder resource grouping method 600 for a MIMO channel according to some aspects of the disclosure. In FIG. 6, the system bandwidth may be divided into an allocated bandwidth and an unallocated bandwidth. The allocated bandwidth may be allocated to one or more UEs (e.g., scheduled entities 106). Two exemplary allocated bandwidths 601 and 620 are illustrated in FIG. 6. These allocated bandwidths may be allocated to different UEs. The allocated bandwidth may be divided into fixed blocks of size equal to a PRG bundling size. The allocated bandwidth 601 may be divided into six blocks 602, 604, 606, 608, 610, and 612. The allocated bandwidth 620 may be divided into six blocks 622, 624, 626, 628, 630, and 632. Because the allocated bandwidth 620 is wider than the bandwidth 601, the boundaries of the blocks are different between the two allocated bandwidths. Compared to the grouping method illustrated in FIG. 5, which determines the precoder resource group boundaries in an absolute manner with respect to the system bandwidth, the method illustrated in FIG. 6 determines the precoder resource group boundaries in a relative manner, relative to the allocated bandwidth. That is, the boundaries between the blocks may be different and not fixed for different allocated bandwidths.

In the example shown in FIG. 6, a bandwidth allocated to the UE may be divided into 6 blocks (e.g., blocks 602, 604, 606, 608, 610, 612) each having a size equal to the PRG bundling size, which may be predetermined or configured by the scheduling entity. In this method, the UE can select a common precoder for RBs allocated within the same block. For example, the UE can use precoder 1 for RBs in block 1, precoder 2 for RBs in block 2, precoder 3 for RBs in block 3, precoder 4 for RBs in block 4, precoder 5 for RBs in block 5, and precoder 6 for RBs in block 6. Similar to the method described in relation to FIG. 5, this precoder selection method can incorporate or exploit the channel coherence across the RBs in the same block by ensuring that the same precoder is used within a contiguous block of RBs.

In some examples, if the allocated bandwidth cannot be evenly divided into blocks of size equal to the PRG bundling size, one or more of the blocks may have a size less than the PRG bundling size, or other methods may be used to select the precoder, for example, as described in relation to FIGS. 5 and 7-10.

Figure 7:
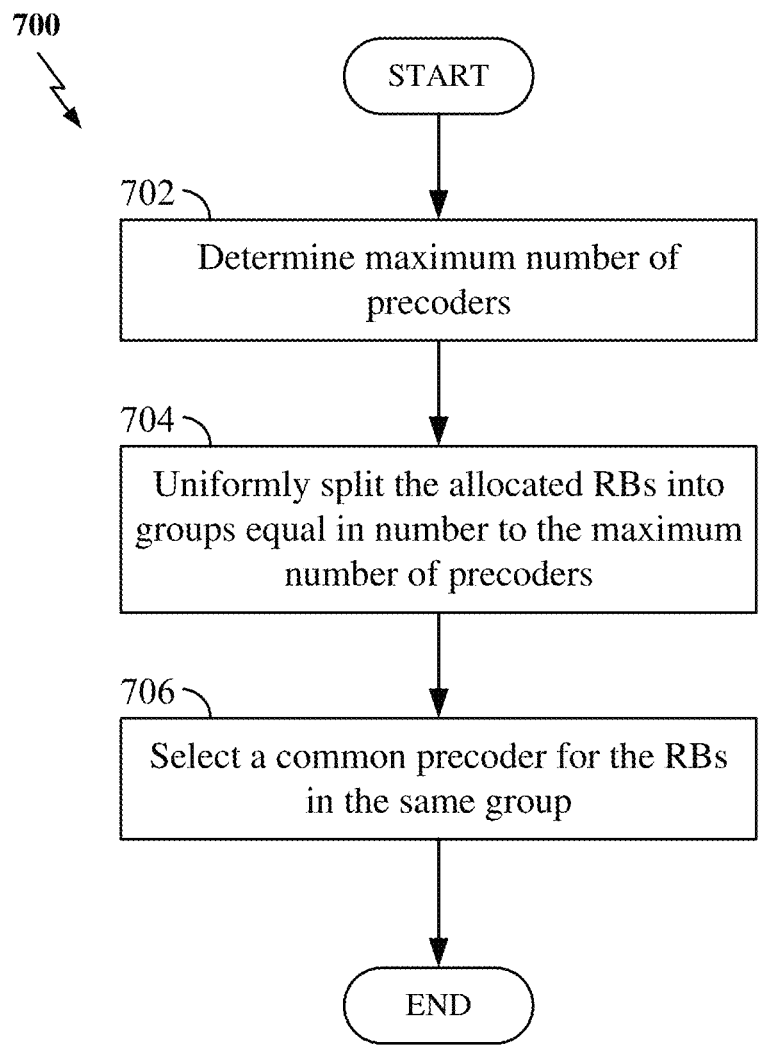
FIGS. 7 and 8 are diagrams illustrating a third precoder resource grouping method for a MIMO channel according to some aspects of the disclosure.

FIG. 7 is a diagram illustrating a third precoder resource grouping method 700 for a MIMO channel according to some aspects of the disclosure. At block 702, a transmitter (e.g., scheduled entity 106 or UE) may determine a maximum number of precoders that can be supported based on a maximum bandwidth (max BW) and a PRG bundling size. The maximum bandwidth (in RBs) may be the system bandwidth, an allocated bandwidth, a maximum bandwidth supported by the transmitter, or a predetermined bandwidth. The base station may signal the system bandwidth in a master information block (MIB) or system information block (SIB) message. The PRG bundling size may be predetermined or configured by the scheduling entity. In one example, the maximum number of precoders may be determined using equation (1).

$$\text{Maximum number of precoders} = \text{max BW/PRG bundling size.} \quad (1)$$

In one example, the max BW has 100 RBs and the PRG bundling size is 5 RBs. In this case, the maximum number of precoders is 20 (i.e., 100 divided by 5). Then at block 704, the transmitter uniformly splits a set of allocated RBs into a plurality of groups equal in number to the maximum number of precoders determined at block 702. The max BW may be the system bandwidth or bandwidth allocated to the UE. By adjusting the PRG bundling size, the UE can control the maximum number of precoders. The allocated RBs may be included in one or more contiguous RB groups. The RB groups are similar to those resource blocks shown in FIG. 6. At block 706, the UE can select a common precoder for RBs in the same group. In some examples, a group may have RBs fewer in number than the PRG bundling size.

Figure 8:
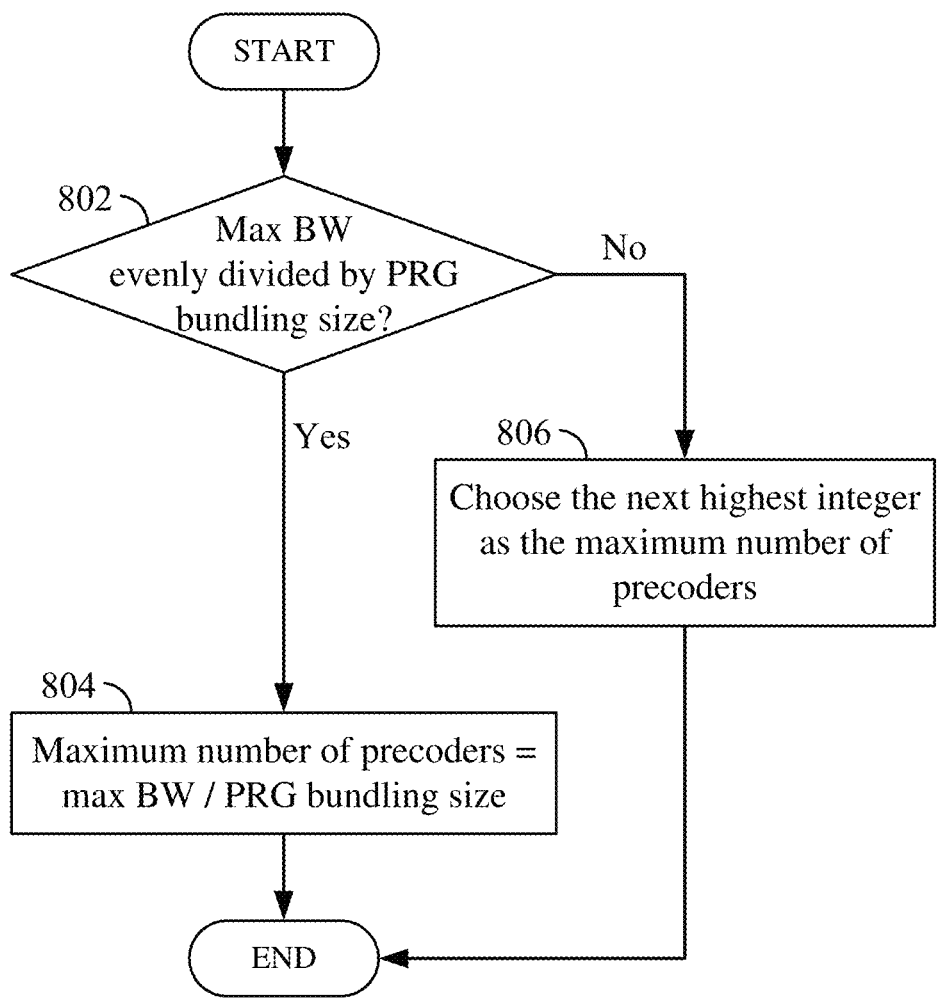

In some examples, referring to FIG. 8, if the max BW can be evenly divided by the PRG bundling size (Yes branch of block 802), at block 804, the maximum number of precoders is determined according to equation (1) above. However, if the max BW cannot be evenly divided by the PRG bundling size (No branch of block 802), at block 806, the next highest integer may be chosen as the maximum number of precoders (block 804) supported by the UE. In some aspects of the disclosure, other methods may be used to select the precoder, for example, as described in relation to FIGS. 5, 6, 9, and 10.

In some aspects of the disclosure, the third precoder resource grouping method shown in FIGS. 7 and 8 may further take into account the UE-side restriction(s) in terms of the maximum number of precoders it can support. For example, the maximum number of precoders determined by equation (1) may be limited or capped by the maximum number of precoders supported by the UE. In addition, the third precoder resource grouping method can also take into account the base station side channel estimation granularity restriction(s). The base station performs channel estimation per group (i.e., RBs using a same precoder), and the base station may be limited in the number of precoders for channel estimation. For example, the result of equation (1) is used if it is less than the maximum number supported by the base station; else the number of precoders used is equal to the maximum number supported by the base station. Therefore, in some examples, the maximum number of precoders may be limited by the base station side and/or UE side restrictions.

Figure 9:
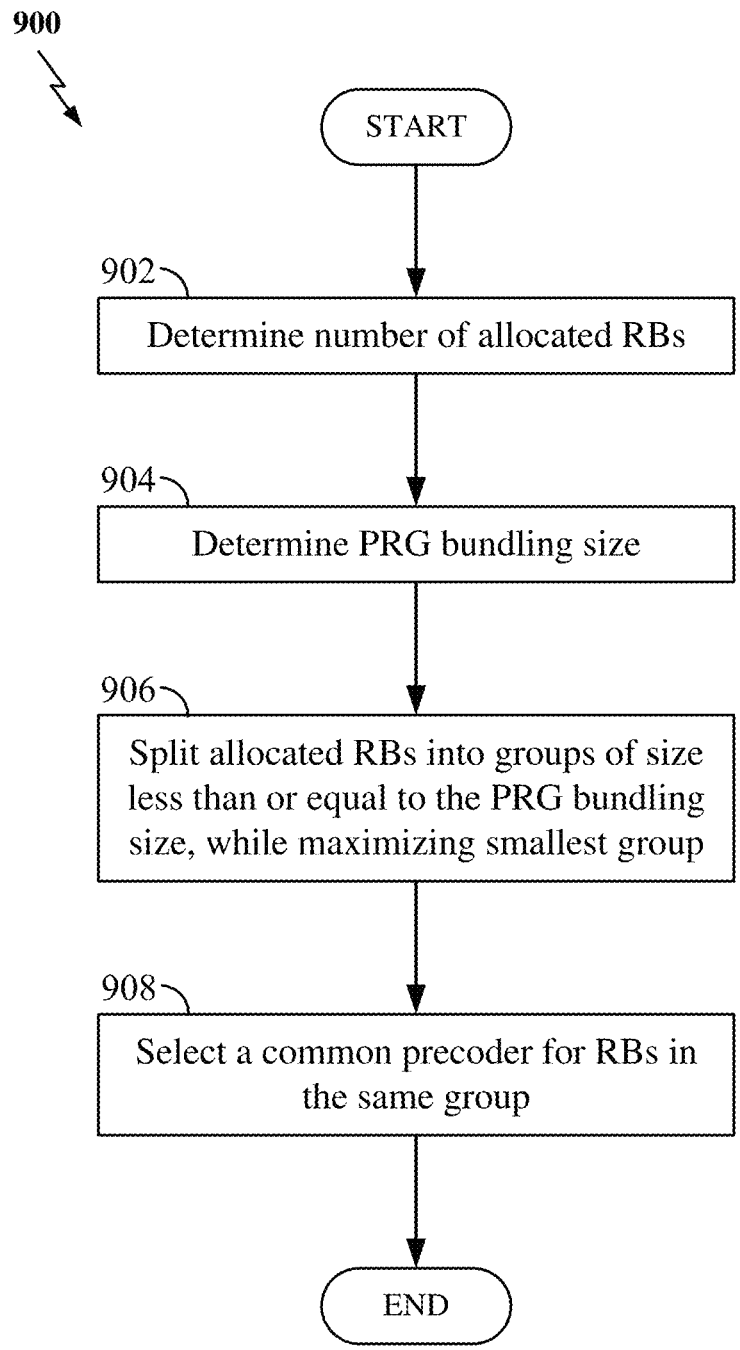
FIGS. 9 and 10 are diagrams illustrating a fourth precoder resource grouping method for a MIMO channel according to some aspects of the disclosure.

FIG. 9 is a diagram illustrating a fourth precoder resource grouping method 900 for a MIMO channel according to some aspects of the disclosure. At block 902, a transmitter (e.g., a scheduled entity 106 or UE) determines a number of allocated RBs (e.g., RBs 408). For example, a UE may determine the number of allocated RBs in an UL grant. The scheduling entity may allocate a certain number of RBs to the UE for UL MIMO communication. The allocated RBs may be contiguous or non-contiguous.

At block 904, the transmitter determines a maximum allowed PRG bundling size, which may be predetermined or configured by the base station. The PRG bundling size indicates the number of RBs in a PRG. A larger PRG bundling size allows more RBs to share a common precoder to exploit channel coherence.

Figure 10:
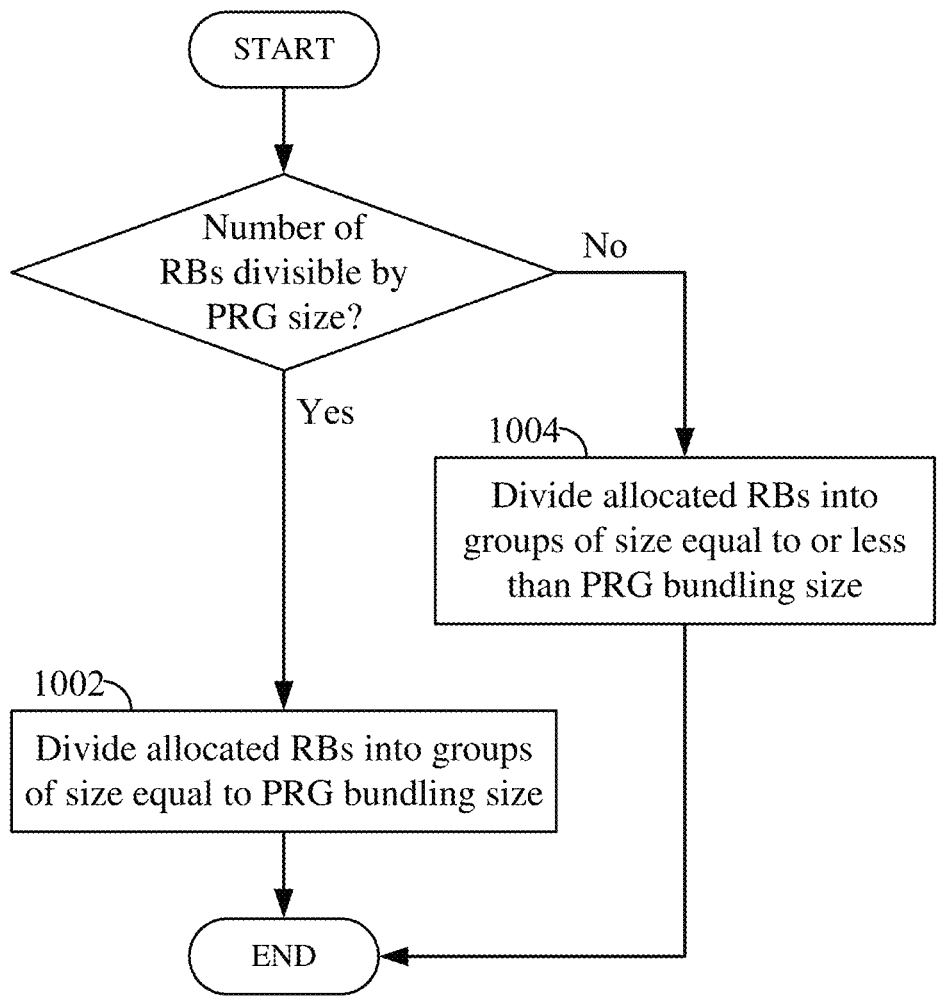

Then at block 906, the transmitter can split or divide the allocated RBs into groups of sizes less than or equal to the PRG bundling size. Referring to FIG. 10, if the number of RBs is divisible by the PRG bundling size, the RBs are divided into groups of size equal to the PRG bundling size (block 1002); otherwise, if the number of RBs is not divisible by the PRG bundling size, the RBs are divided into groups having sizes less than or equal to the PRG bundling size (block 1004). In one aspect of the disclosure, the size of the smallest group is maximized if the number of RBs is not divisible by the PRG size. In one embodiment, the groups may have equal size. In some embodiments, some groups may have sizes equal to the PRG bundling size, and some groups may have sizes less than the PRG bundling size.

At block 908, the transmitter selects a common precoder for the RBs in the same group. In one example, if the transmitter is allocated 8 RBs (contiguous or not), and the PRG bundling size is 4, then the transmitter may group the RBs into two groups (e.g., group [1, 2, 3, 4] and group [5, 6, 7, 8]). In another example, the transmitter may be allocated 9 RBs, and the PRG bundling size is 4, then the transmitter may group the RBs into three groups (e.g., group [1, 2, 3], group [4, 5, 6], group [7, 8, 9]). In this case, the number of RBs (i.e., 9) is not divisible by the PRG bundling size (i.e., 4), and the sizes of the RB groups are smaller than the PRG bundling size of 4. In some aspects of the disclosure, the transmitter may group the RBs into groups of different sizes. That is, one group may have more or fewer RBs than another group. In one example, the transmitter may be allocated 10 RBs, and PRG bundling size is 4. In this case, the transmitter may group the RBs into three groups as follows: [1, 2, 3, 4], [5, 6, 7], [8, 9, 10], in order to maximize the size of the smallest group. Maximizing the minimum group size leads to a more balanced grouping and may provide a benefit of improving the worst channel estimation quality, since the channel estimation quality of an RB may depend on the size of the group containing it. These resource grouping examples are illustrative in nature, and the transmitter (e.g., UE) may group the RBs differently in other examples.

The fourth precoder resource grouping method 900 may provide better channel estimation accuracy than the first to third methods described in relation to FIGS. 5-8 because the fourth group method 900 may allow the base station to derive or determine the channel estimation using a large set of RBs. For example, since the channel estimation processing gain depends on the number of RBs used for the estimation, i.e., on the number of RBs over which the precoder is the same, maximizing the smallest group provides better channel estimation based on a larger set of RBs.

The base station or scheduling entity may configure the UEs in the network to use any one of the above described precoder resource grouping methods to divide RBs into groups, where RBs in the same group use the same precoder.

The scheduling entity may also change the UE from using one grouping method to another grouping method due to changing conditions, for example, frequency selectivity of a channel, UE restrictions, base station restrictions, operating SINR, sensitivity to channel estimation accuracy, and accuracy of initial channel estimation.

In one aspect of the disclosure, the scheduling entity may use the same grouping configuration for all UEs in the network. In some aspects of the disclosure, the scheduling entity may configure the UEs to use any of the above described precoder resource grouping methods by sending a grouping configuration to the UE in an RRC message, a master information block (MIB) and/or system information block (SIB) message, and/or a DCI in a group-common PDCCH. In some aspects of the disclosure, the UE may transmit a recommended precoder resource grouping configuration to the scheduling entity, for example, using an uplink control channel (e.g., PUCCH). The recommendation for precoder resource grouping configuration signaled by the UE may include information about the UE's capabilities and constraints related to PRG configuration such as limits on the number and/or size of PRGs that the UE can support.

In some aspects of the disclosure, such configuration may be determined in a UE-specific manner. For example, the base station may configure different UEs to use different precoder resource grouping methods as described above. To that end, the base station may send the grouping configuration for a specific UE in an RRC message or a DCI in a PDCCH dedicated to that UE. The ability to configure the UEs to use different precoder resource grouping methods may be useful when the UEs have different capabilities, limitations, and/or requirements on channel estimation accuracy due to differences in link quality.

Figure 11:
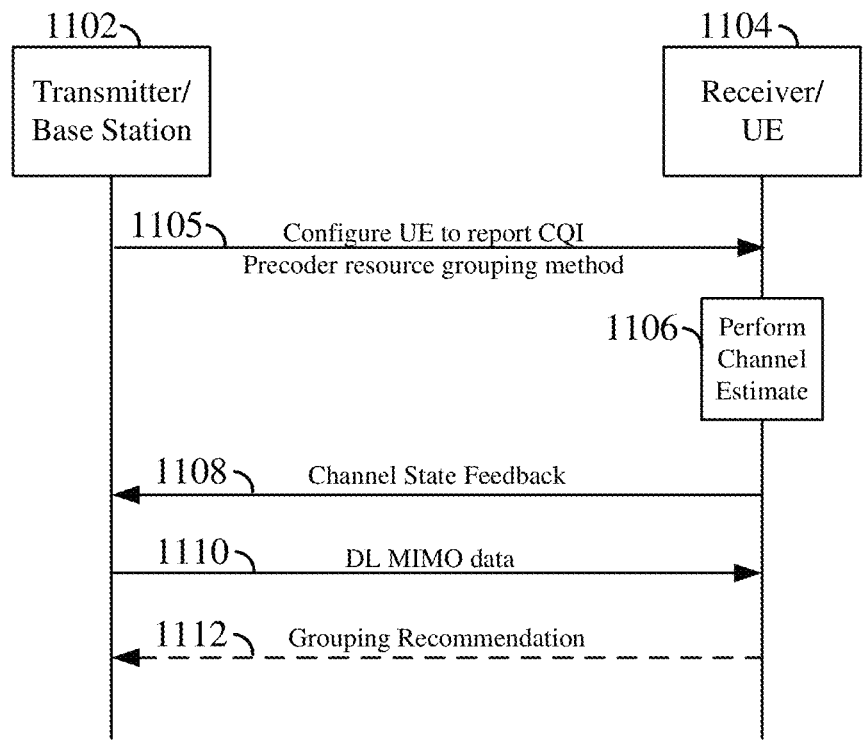
FIG. 11 is a diagram illustrating a process for configuring a user equipment (UE) to use a precoder resource grouping method to provide channel state feedback.

In some aspects of the disclosure, the scheduling entity may configure the UE to use one of the precoder resource grouping methods described above in determining channel state information (CSI). FIG. 11 is a diagram illustrating a process for configuring a UE to use a precoder resource grouping method to provide channel state feedback. Referring to FIG. 11, a base station 1102 (e.g., a scheduling entity 108) may transmit a message 1105 (e.g., an RRC message) to configure a UE 1104 (e.g., a scheduled entity 106) to report CQI periodically or aperiodically. The base station 1102 may also indicate to the UE the precoder resource grouping method, which may be one of the precoder resource grouping methods described above in relation to FIGS. 5-10. In response, the UE 1104 may perform channel estimation 1106 of a downlink channel between the UE 1104 and a base station 1102. Based on the indicated precoder resource grouping method, the UE may compute or determine a precoder (e.g., PMI) for each configured RB group (i.e., precoder resource group) and then compute the CQI accordingly for each group. That is, the CQI is computed based on the assumption that a specific PRG value has been chosen according to the configured method indicated by the base station. This way, the base station can configure the UE to measure the CQI for a specific PRG configuration. Then, the UE 1104 can transmit corresponding channel state feedback 1108 to the base station 1102. For example, the channel state feedback 1108 may include the PMI and CQI of the channel for each precoder resource group. The base station 1102 may then use this PMI/CQI report for its subsequent DL transmission 1110. For example, the base station (transmitter) may apply precoding to the DL transmission according to the PMI, and select the modulation scheme and code rate based on the CQI.

In some aspects of the disclosure, a precoder resource grouping method different from the methods described above in relation to FIGS. 5-11, may be applied for DFT-S-OFDM UL. In some examples, DFT-S-OFDM allows allocation of RBs in clusters (i.e., contiguous RBs groups) to flexibly cope with a frequency selective fading environment by enabling frequency selective resource allocation. The precoder resource groups may be implicitly assumed to be the same as the clusters of DFT-S-OFDM. That is, a precoder resource group and a cluster have the same RBs. In this case, the same precoder may be used for RBs in the same cluster. The UE may select a precoder for a cluster of RBs based on the UE's estimation of the MIMO channel to the base station in that cluster of RBs. The channel estimate may be determined based on a downlink reference signal such as CSI-RS. In some examples, the UE may switch between DFT-S-OFDM and cyclic prefix OFDM (CP-OFDM) dynamically. Therefore, whenever the switch between DFT-S-OFDM and CP-OFDM occurs, the base station may configure/reconfigure the UE to change the precoding method. The UE may be configured to use any of the precoder resource grouping methods described above in relation to FIGS. 5-11.

Figure 12:
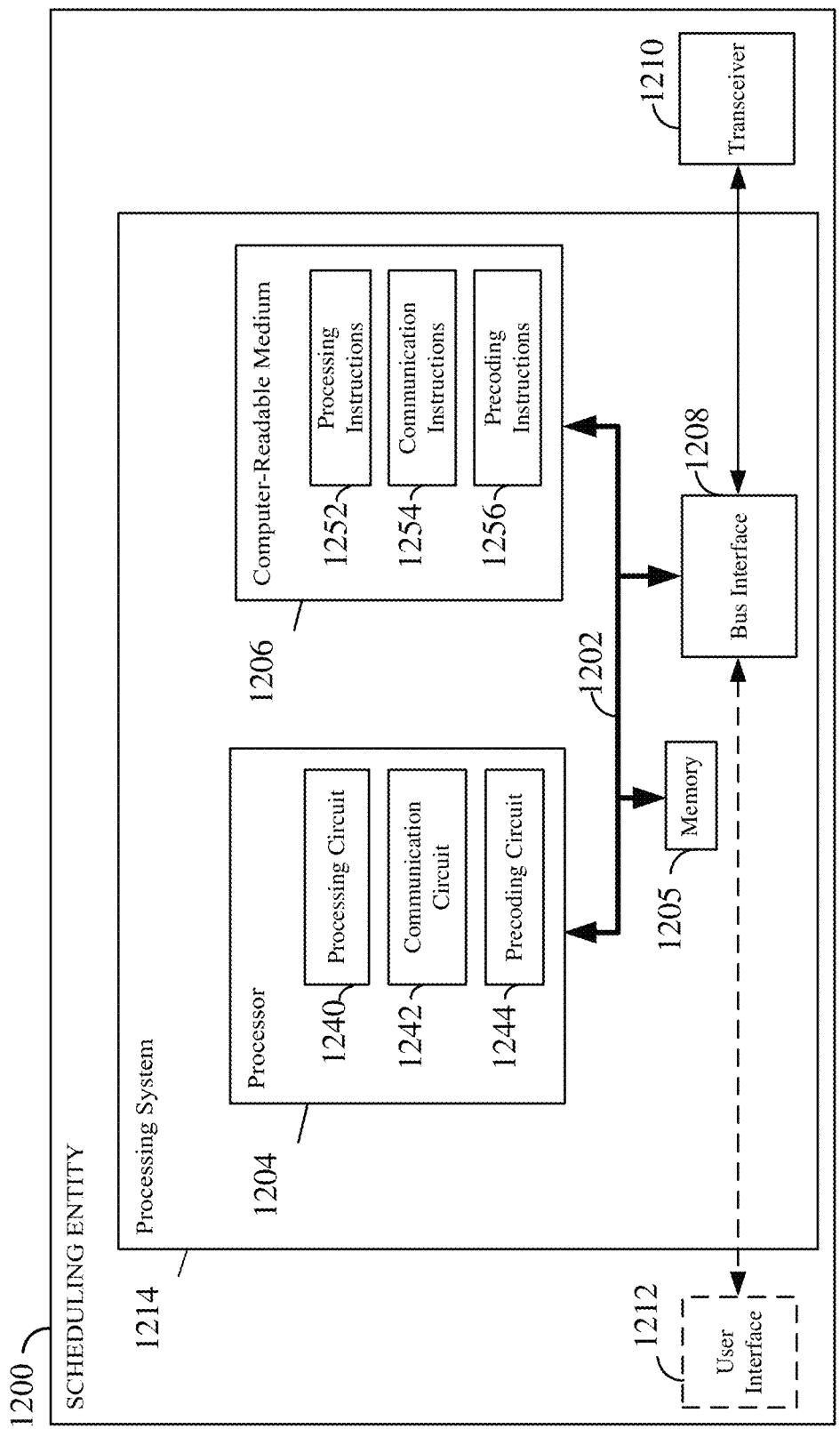
FIG. 12 is a block diagram conceptually illustrating an example of a hardware implementation for a scheduling entity according to some aspects of the disclosure.

FIG. 12 is a block diagram illustrating an example of a hardware implementation for a scheduling entity 1200 employing a processing system 1214. For example, the scheduling entity 1200 may be a user equipment (UE) as illustrated in any one or more of FIGS. 1, 2, 3, and/or 11. In another example, the scheduling entity 1200 may be a base station as illustrated in any one or more of FIGS. 1, 2, 3, and/or 11.

The scheduling entity 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1200 may be configured to perform any one or more of the functions described herein. That is, the processor 1204, as utilized in a scheduling entity 1200, may be used to implement any one or more of the processes and procedures described and illustrated in relation to FIGS. 5-11 and 14.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210. The transceiver 1210 provides a communication interface or means for communicating with various other apparatus over a transmission medium. Depending upon the nature of the apparatus, a user interface 1212 (e.g., keypad, display, speaker, microphone, joystick) may also be provided. Of course, such a user interface 1212 is optional, and may be omitted in some examples, such as a base station.

In some aspects of the disclosure, the processor 1204 may include various circuitry configured for various functions, including, for example, a processing circuit 1240, a communication circuit 1242, and a precoding circuit 1244. For example, the circuitry may be configured to implement one or more of the precoding functions described in relation to FIGS. 5-11 and 13.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206. The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1206 may include software configured for various functions, including, for example, processing instructions 1252, communication instructions 1254, and precoding instructions 1256. For example, the software may be configured to implement one or more of the functions described in relation to FIGS. 5-11 and 13.

Figure 13:
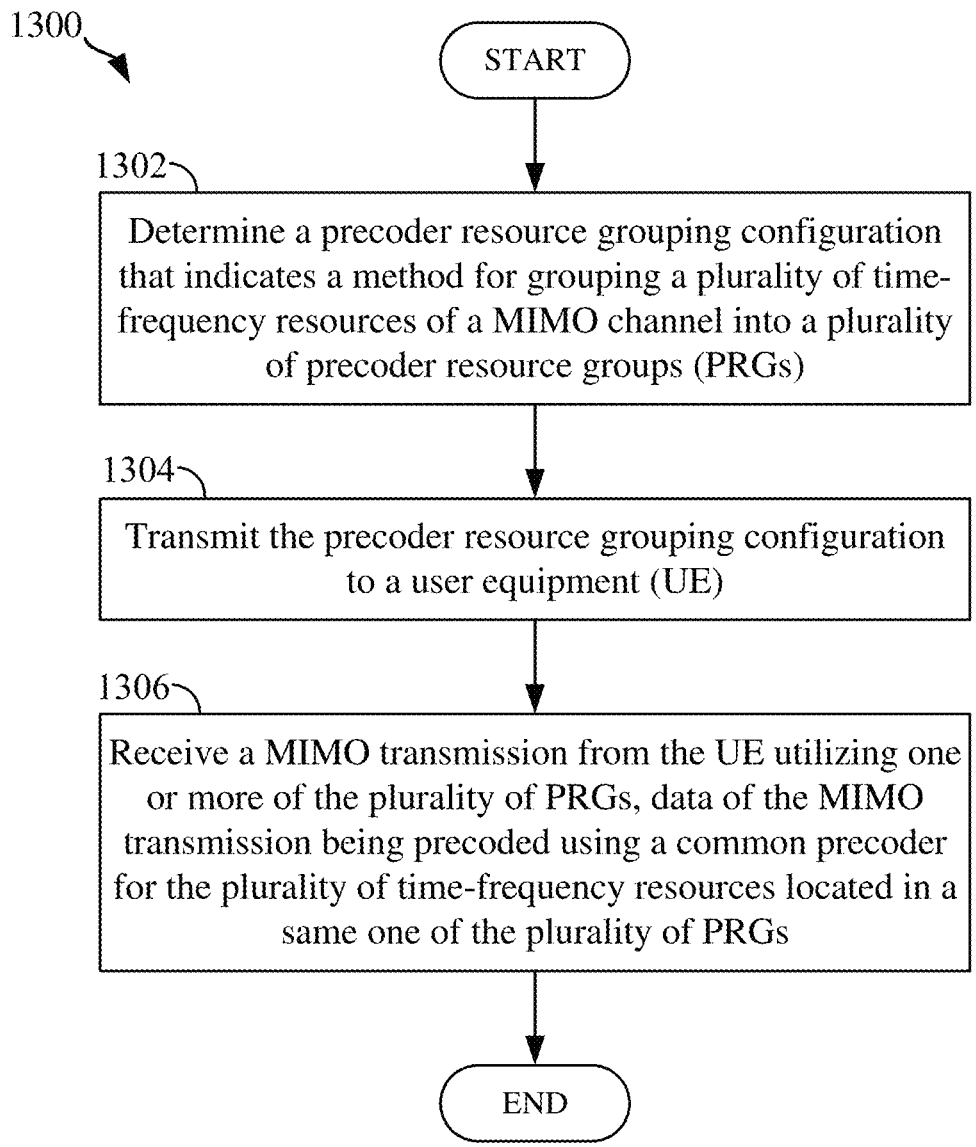
FIG. 13 is a flow chart illustrating an exemplary process for selecting a method for grouping precoder resources according to some aspects of the disclosure.

FIG. 13 is a flow chart illustrating an exemplary process 1300 for selecting a method for grouping precoder resources in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the scheduling entity 1200 illustrated in FIG. 12. In some examples, the process 1300 may be carried out by any suitable apparatus or means for carrying out the functions or algorithm described below.

At block 1302, a scheduling entity 1200 (e.g., a base station, eNB, gNB) may utilize its processing circuit 1240 and/or precoding circuit 1246 to determine a precoder resource grouping configuration that indicates a method for grouping a plurality of time-frequency resources of a MIMO channel into a plurality of precoder resource groups (PRGs). In some aspects of the disclosure, the method may be one of the precoder resource grouping methods described above in relation to FIGS. 5-11. In some examples, the scheduling entity may determine the configuration based on various considerations such as frequency selectivity of the channel, control signaling overhead, UE restrictions, base station restrictions, SINR, sensitivity to channel estimation accuracy, etc. In various examples, one or more of these considerations may be more important than the others. The processes disclosed in this disclosure provide a mechanism to choose a certain precoder resource grouping method depending on these considerations and/or others.

In one aspect of the disclosure, the algorithm for selecting a PRG grouping method may apply certain conditions to identify which of the above listed factors is the dominating or more important criterion in a given scenario, and select the appropriate PRG configuration method for that scenario. For example, for a cell-edge UE, the channel estimation accuracy may be low, and hence the method of FIG. 9 is suitable because it maximizes the minimum size of the PRGs in order to improve the channel estimation accuracy. In another example, if signaling overhead is a dominant consideration, then a common configuration may be conveyed to all UEs in order to minimize the signaling overhead associated with communicating the PRG configuration. The method of FIG. 5 is well-suited for this purpose because it only depends on the system bandwidth but not on the UE's allocated bandwidth. In the absence of such considerations, the algorithm may determine a suitable PRG size and/or number of PRGs based on the base station and UE-side constraints.

At block 1304, the scheduling entity may utilize its communication circuit 1242 and transceiver 1210 (see FIG. 12) to transmit the precoder resource grouping configuration to a UE or scheduled entity. In some examples, the scheduling entity may transmit the precoder resource grouping configuration in an RRC message, MIB, SIB, and/or DCI. For example, the precoder resource grouping configuration may indicate one of the grouping methods described in relation to FIGS. 5-11.

At block 1306, the scheduling entity may utilize its communication circuit 1242 and transceiver 1210 to receive a MIMO transmission from the UE utilizing one or more of the plurality of PRGs. The data of the MIMO transmission is precoded using a common precoder for the plurality of time-frequency resources located in a same one of the plurality of PRGs. In some examples, the common precoder may not be based on a codebook.

In a DL example, the scheduling entity (e.g., base station) may receive channel state information (CSI) or feedback based at least in part on the precoder resource grouping configuration transmitted to the UE. In this case, the channel state feedback (e.g., CSI) may indicate the common precoder used for precoding data transmitted using the time-frequency resources for one or more of the plurality of PRGs.

Figure 14:
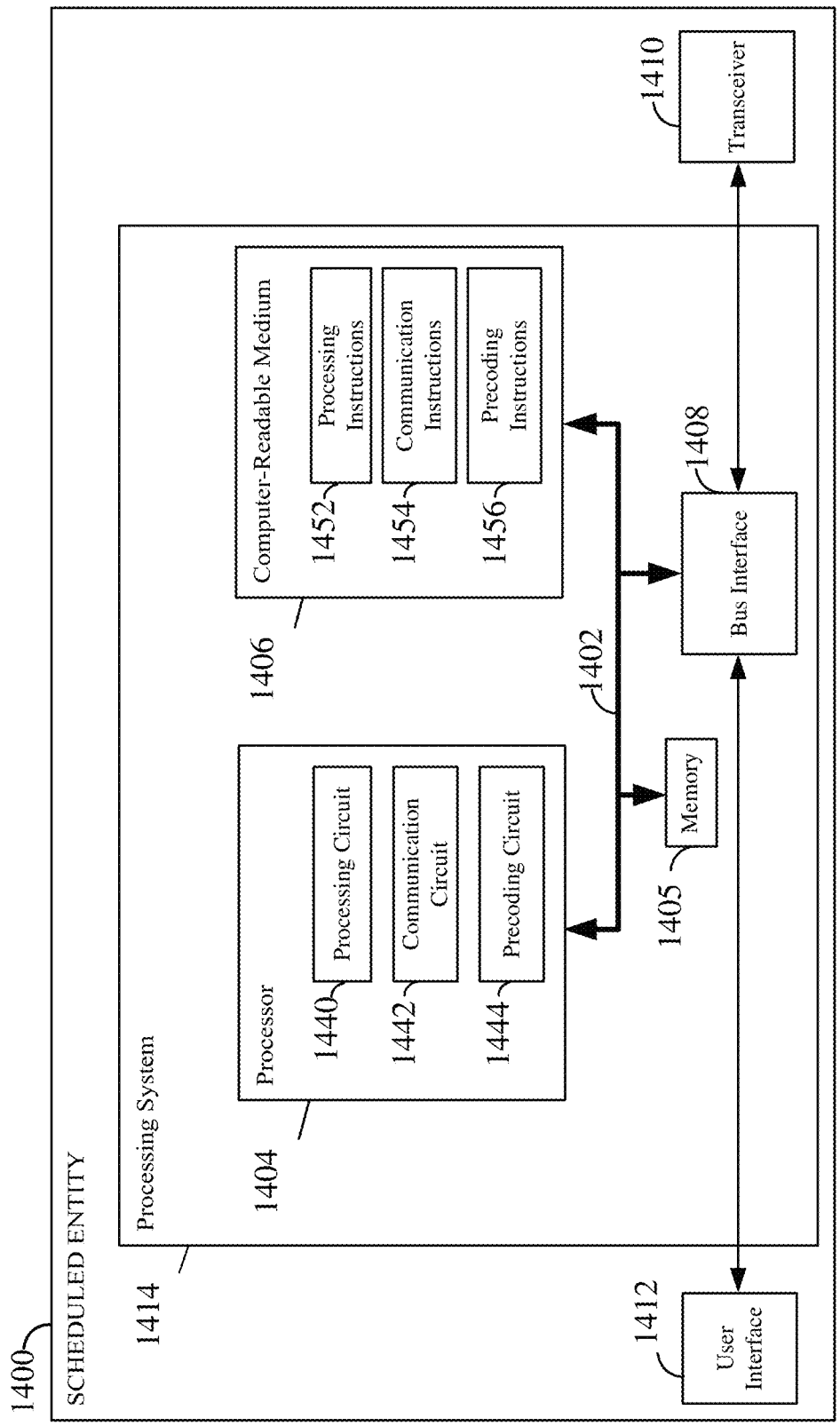
FIG. 14 is a block diagram conceptually illustrating an example of a hardware implementation for a scheduled entity according to some aspects of the disclosure.

FIG. 14 is a conceptual diagram illustrating an example of a hardware implementation for an exemplary scheduled entity 1400 employing a processing system 1414. In accordance with various aspects of the disclosure, an element, or any portion of an element, or any combination of elements may be implemented with a processing system 1414 that includes one or more processors 1404. For example, the scheduled entity 1400 may be a user equipment (UE) as illustrated in any one or more of FIGS. 1, 2, 3, and/or 11.

The processing system 1414 may be substantially the same as the processing system 1214 illustrated in FIG. 12, including a bus interface 1408, a bus 1402, memory 1405, a processor 1404, and a computer-readable medium 1406. Furthermore, the scheduled entity 1400 may include a user interface 1412 and a transceiver 1410 substantially similar to those described above in FIG. 12. That is, the processor 1404, as utilized in a scheduled entity 1400, may be used to implement any one or more of the processes described and illustrated in relation to FIGS. 5-11 and 15.

In some aspects of the disclosure, the processor 1404 may include various circuitry configured for various functions, including, for example, a processing circuit 1440, a communication circuit 1442, and a precoding circuit 1444. For example, the circuitry may be configured to implement one or more of the functions described in relation to FIG. 15.

Figure 15:
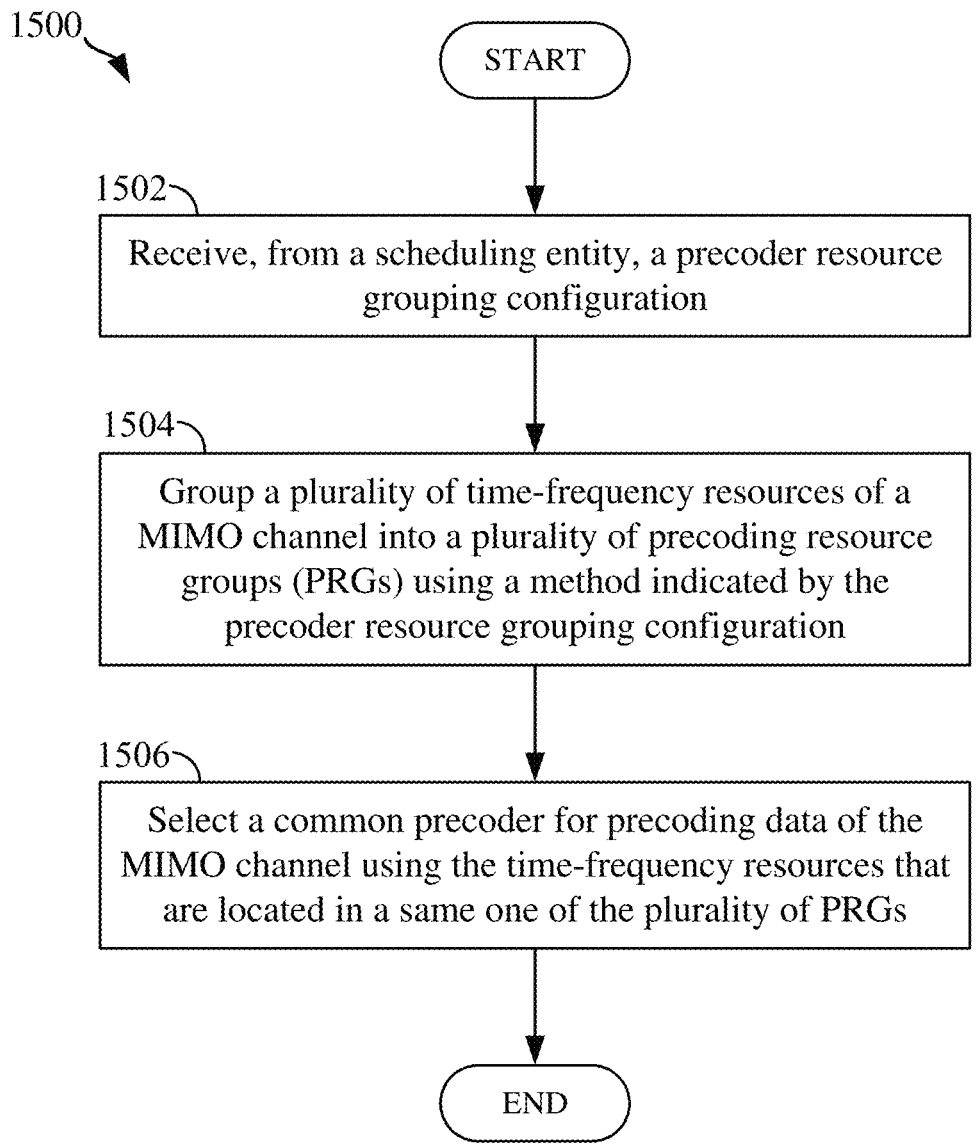
FIG. 15 is a flow chart illustrating an exemplary process for selecting a method for grouping precoder resources according to some aspects of the disclosure.

FIG. 15 is a flow chart illustrating an exemplary process 1500 for selecting a method for grouping precoder resources according to some aspects of the present disclosure. As described below, some or all illustrated features may be omitted in a particular implementation within the scope of the present disclosure, and some illustrated features may not be required for implementation of all embodiments. In some examples, the process 1500 may be carried out by the scheduled entity 1400 illustrated in FIG. 14. In some examples, the process 1500 may be carried out by any suitable apparatus or means for carrying out the functions or algorithm described below.

At block 1502, a scheduled entity (e.g., UE) may utilize its communication circuit 1440 and transceiver 1410 (see FIG. 14) to receive a precoder resource grouping configuration from a scheduling entity (e.g., a base station, eNB, or gNB). The precoder resource grouping configuration may indicate one of the precoder resource grouping methods described in relation to FIGS. 5-11. In some examples, the scheduled entity may receive the configuration in an RRC message, MIB, SIB, and/or DCI. In some examples, the scheduled entity may receive the configuration in a message (e.g., broadcast message) dedicated to a group of UEs or a message (e.g., UE-specific message) dedicated only to the scheduled entity.

At block 1504, the UE may utilize its processing circuit 1442 to group a plurality of time-frequency resources of a MIMO channel into a plurality of precoding resource groups (PRGs) using a method indicated by the precoder grouping configuration. In one example, the UE may divide the system communication bandwidth into fixed PRGs of a size (i.e., number of RBs) equal to a precoder resource group (PRG) bundling size. The system communication bandwidth may be the entire bandwidth supported by the scheduling entity or the UE. In another example, the UE may divide its allocated bandwidth into fixed precoder resource groups of size equal to the PRG bundling size. In this case, the allocated bandwidth may be smaller than the system supported bandwidth. In another example, the UE may determine a maximum number of precoders supported based on a maximum bandwidth (max BW) and PRG bundling size. In another example, the UE may split the set of allocated RBs into groups of size smaller than or equal to the PRG size, preferably of equal size, and selects a precoder per group.

At block 1506, the UE may utilize a precoding circuit 1444 (see FIG. 14) to select a common precoder for precoding data of the MIMO channel using the time-frequency resources that are located in a same one of the plurality of PRGs. In some examples, the precoder may not be based on a codebook.

In an UL example, the UE can generate a MIMO transmission based on the precoder selected in block 1506. In a DL example, the UE may compute and transmit channel state information (CSI) based at least in part on the precoder resource grouping configuration received from the base station. The channel state feedback (e.g., CSI) may indicate the common precoder for precoding the time-frequency resources for one or more of the plurality of blocks within a PRG. In this example of using channel state feedback for downlink, the selected precoder may be based on a codebook, and the precoding matrix index (PMI) from the codebook is signaled in the CSI feedback. Alternately, the UE may use the configured PRG size for performing channel estimation, and may then derive and feedback a channel quality indication (CQI) to the base station. For uplink transmissions, the UE may select a precoder that is not in any codebook. The UL pilot that accompanies the data transmission may be used by the base station to estimate the effective channel including the effects of the precoder applied by the UE.

In one configuration, the apparatus 1200 and/or 1400 for wireless communication includes means for performing various precoder resource grouping methods described above in relation to FIGS. 5-11, 13, and 15. In one aspect, the aforementioned means may be the processor(s) 1204/1404 in which the invention resides shown in FIG. 12/14 configured to perform the functions recited by the aforementioned means. In another aspect, the aforementioned means may be a circuit or any apparatus configured to perform the functions recited by the aforementioned means.

Of course, in the above examples, the circuitry included in the processor 1204/1404 is merely provided as an example, and other means for carrying out the described functions may be included within various aspects of the present disclosure, including but not limited to the instructions stored in the computer-readable storage medium 1206/1406, or any other suitable apparatus or means described in any one of the FIGS. 1, 2, 3, and/or 11, and utilizing, for example, the processes and/or algorithms described herein in relation to FIGS. 5-11, 13, and 15.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the $3^{rd}$ Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of multiple-input multiple-output (MIMO) communication, comprising:
   receiving, from a scheduling entity, a precoder resource grouping configuration that indicates a procedure among a plurality of procedures for grouping a plurality of time-frequency resources of a MIMO channel;
   grouping the plurality of time-frequency resources into a plurality of precoder resource groups (PRGs) based on a precoder resource group (PRG) bundling size using the procedure indicated by the precoder resource grouping configuration; and
   selecting a common precoder for precoding data of the MIMO channel using the time-frequency resources that are located in a same one of the plurality of PRGs, the same common precoder being used for all time-frequency resources within the same PRG.

2. The MIMO communication method of claim 1, wherein the time-frequency resources span a system bandwidth of the scheduling entity, and
   wherein the grouping comprises dividing the time-frequency resources into the plurality of PRGs, each PRG having a size less than or equal to the PRG bundling size according to the precoder resource grouping configuration.

3. The MIMO communication method of claim 1, wherein the time-frequency resources comprise only time-frequency resources allocated to a user equipment (UE) for transmission, and
   wherein the grouping comprises dividing the time-frequency resources into the plurality of PRGs, each PRG having a size less than or equal to the PRG bundling size according to the precoder resource grouping configuration.

4. The MIMO communication method of claim 1, wherein the grouping comprises:
   determining a maximum number of precoders allowed for precoder resource grouping based on a maximum bandwidth and the PRG bundling size; and
   uniformly dividing the plurality of time-frequency resources allocated to the UE, into the plurality of PRGs equal in number to the maximum number of precoders.

5. The MIMO communication method of claim 1, wherein the grouping comprises:
   dividing the plurality of time-frequency resources allocated to a user equipment, into the plurality of PRGs, each PRG having a size equal to or less than the PRG bundling size such that the size of a smallest PRG is maximized.

6. The MIMO communication method of claim 5, wherein the plurality of PRGs comprise a first PRG and a second PRG, the first PRG comprises fewer allocated time-frequency resources than the second PRG.

7. The MIMO communication method of claim 1, wherein the receiving comprises at least one of:
   receiving the precoder resource grouping configuration in a message dedicated to a plurality of user equipment; or
   receiving the precoder resource grouping configuration in a message dedicated to a specific user equipment (UE).

8. The MIMO communication method of claim 1, further comprising:
   transmitting a recommended precoder resource grouping configuration to the scheduling entity.

9. The MIMO communication method of claim 8, wherein the recommended precoder resource grouping configuration comprises user equipment capabilities and constraints related to PRG configuration.

10. An apparatus configured for multiple-input multiple-output (MIMO) communication, comprising:
    a communication interface configured for MIMO communication;
    a memory; and
    a processor operatively coupled to the communication interface and the memory, wherein the processor and the memory are configured to:
       receive, from a scheduling entity, a precoder resource grouping configuration that indicates a procedure among a plurality of procedures for grouping a plurality of time-frequency resources of a MIMO channel;
       group the plurality of time-frequency resources into a plurality of precoder resource groups (PRGs) based on a precoder resource group (PRG) bundling size using the procedure indicated by the precoder resource grouping configuration; and
       select a common precoder for precoding data of the MIMO channel using the time-frequency resources that are located in a same one of the plurality of PRGs, the same common precoder being used for all time-frequency resources within the same PRG.

11. The apparatus of claim 10,
    wherein the time-frequency resources span a system bandwidth of the scheduling entity, and
    wherein the processor and the memory are further configured to divide the time-frequency resources into the plurality of PRGs, each PRG having a size less than or equal to the PRG bundling size according to the precoder resource grouping configuration.

12. The apparatus of claim 10,
    wherein the time-frequency resources comprise only time-frequency resources allocated to a user equipment (UE) for transmission, and
    wherein the processor and the memory are further configured to divide the time-frequency resources into the plurality of PRGs, each PRG having a size less than or equal to the PRG bundling size according to the precoder resource grouping configuration.

13. The apparatus of claim 10, wherein the processor and the memory are further configured to:
    determine a maximum number of precoders allowed for precoder resource grouping based on a maximum bandwidth and the PRG bundling size; and
    uniformly divide the plurality of time-frequency resources allocated to the UE, into the plurality of PRGs equal in number to the maximum number of precoders.

14. The apparatus of claim 10, wherein the processor and the memory are further configured to divide the plurality of time-frequency resources allocated to a user equipment, into the plurality of PRGs, each PRG having a size equal to or less than the PRG bundling size such that the size of a smallest PRG is maximized.

15. The apparatus of claim 14, wherein the plurality of PRGs comprise a first PRG and a second PRG, the first PRG comprises fewer allocated time-frequency resources than the second PRG.

16. The apparatus of claim 10, wherein the processor and the memory are further configured to, at least one of:
   receive the precoder resource grouping configuration in a message dedicated to a plurality of user equipments; or
   receive the precoder resource grouping configuration in a message dedicated to a specific user equipment (UE).

17. The apparatus of claim 10, wherein the processor and the memory are further configured to:
   transmit a recommended precoder resource grouping configuration to the scheduling entity.

18. The apparatus of claim 17, wherein the recommended precoder resource grouping configuration comprises user equipment capabilities and constraints related to PRG configuration.

19. A method of multiple-input multiple-output (MIMO) communication, comprising:
   determining, at a scheduling entity, a precoder resource grouping configuration that indicates a procedure among a plurality of procedures for grouping a plurality of time-frequency resources of a MIMO channel into a plurality of precoder resource groups (PRGs) based on a precoder resource group (PRG) bundling size;
   transmitting the precoder resource grouping configuration to a user equipment (UE); and
   receiving a MIMO transmission from the UE utilizing one or more of the plurality of PRGs, data of the MIMO transmission being precoded using a common precoder for the plurality of time-frequency resources located in a same one of the plurality of PRGs.

20. The MIMO communication method of claim 19,
   wherein the time-frequency resources span a system bandwidth of the scheduling entity, and
   wherein the grouping comprises dividing the time-frequency resources into the plurality of PRGs, each precoder resource group (PRG) having a size less than or equal to the PRG bundling size according to the precoder resource grouping configuration.

21. The MIMO communication method of claim 19,
   wherein the time-frequency resources comprise only time-frequency resources allocated to the UE for transmission, and
   wherein the grouping comprises dividing the time-frequency resources into the plurality of PRGs, each precoder resource group (PRG) having a size less than or equal to the PRG bundling size according to the precoder resource grouping configuration.

22. The MIMO communication method of claim 19, wherein the grouping comprises:
   determining a maximum number of precoders allowed for precoder resource grouping based on a maximum bandwidth and the PRG bundling size; and
   uniformly dividing the plurality of time-frequency resources allocated to the UE, into the plurality of PRGs equal in number to the maximum number of precoders.

23. The MIMO communication method of claim 19, wherein the grouping comprises:
   dividing the plurality of time-frequency resources allocated to the UE, into the plurality of PRGs, each precoder resource group (PRG) having a size equal to or less than the PRG bundling size such that the size of a smallest PRG is maximized.

24. The MIMO communication method of claim 19, further comprising:
   determining the precoder resource grouping configuration based on at least one of:
   frequency selectivity of the MIMO channel;
   restrictions of the UE;
   restrictions of a base station,
   a signal-to-interference-and-noise ratio (SINR) of the MIMO channel; or
   a channel estimation accuracy.

25. An apparatus configured for multiple-input multiple-output (MIMO) communication, comprising:
   a communication interface configured for MIMO communication;
   a memory; and
   a processor operatively coupled to the communication interface and the memory, wherein the processor and the memory are configured to:
   determine a precoder resource grouping configuration that indicates a method procedure among a plurality of procedures for grouping a plurality of time-frequency resources of a MIMO channel into a plurality of precoder resource groups (PRGs) based on a precoder resource group (PRG) bundling size;
   transmit the precoder resource grouping configuration to a user equipment (UE); and
   receive a MIMO transmission from the UE utilizing one or more of the plurality of PRGs, data of the MIMO transmission being precoded using a common precoder for the plurality of time-frequency resources located in a same one of the plurality of PRGs.

26. The apparatus of claim 25, wherein the grouping comprises:
   dividing the time-frequency resources into the plurality of PRGs, each precoder resource group (PRG) having a size less than or equal to the PRG bundling size according to the precoder resource grouping configuration,
   wherein the time-frequency resources span a system bandwidth of the apparatus.

27. The apparatus of claim 25, wherein the grouping comprises:
   dividing the time-frequency resources into the plurality of PRGs, each precoder resource group (PRG) having a size less than or equal to the PRG bundling size according to the precoder resource grouping configuration,
   wherein the time-frequency resources comprise only time-frequency resources allocated to the UE.

28. The apparatus of claim 25, wherein the grouping comprises:
   determining a maximum number of precoders allowed for precoder resource grouping based on a maximum bandwidth and the PRG bundling size; and
   uniformly dividing the plurality of time-frequency resources allocated to the UE, into the plurality of PRGs equal in number to the maximum number of precoders.

29. The apparatus of claim 25, wherein the grouping comprises:
   dividing the plurality of time-frequency resources allocated to the UE, into the plurality of PRGs, each precoder resource group (PRG) having a size equal to or less than the PRG bundling size such that the size of a smallest PRG is maximized.

30. The apparatus of claim 25, wherein the processor and the memory are further configured to determine the precoder resource grouping configuration based on at least one of:
   frequency selectivity of the MIMO channel;
   restrictions of the UE;
   restrictions of a base station, a signal-to-interference-and-noise ratio (SINR) of the MIMO channel; or a channel estimation accuracy.

\* \* \* \* \*